(12) United States Patent
Kawamura et al.

(10) Patent No.: US 10,819,980 B2
(45) Date of Patent: Oct. 27, 2020

(54) MOVING IMAGE CODING DEVICE, MOVING IMAGE DECODING DEVICE, AND PROGRAM

(71) Applicant: KDDI CORPORATION, Tokyo (JP)

(72) Inventors: Kei Kawamura, Tokyo (JP); Sei Naito, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 1 day.

(21) Appl. No.: 16/348,017

(22) PCT Filed: Sep. 20, 2017

(86) PCT No.: PCT/JP2017/033908
§ 371 (c)(1),
(2) Date: May 7, 2019

(87) PCT Pub. No.: WO2018/092409
PCT Pub. Date: May 24, 2018

(65) Prior Publication Data
US 2019/0289290 A1    Sep. 19, 2019

(30) Foreign Application Priority Data
Nov. 15, 2016    (JP) .................. 2016-222616

(51) Int. Cl.
*H04N 19/503* (2014.01)
*H04N 19/124* (2014.01)
(Continued)

(52) U.S. Cl.
CPC ......... *H04N 19/124* (2014.11); *H04N 19/126* (2014.11); *H04N 19/159* (2014.11);
(Continued)

(58) Field of Classification Search
CPC .. H04N 19/124; H04N 19/126; H04N 19/167; H04N 19/463; H04N 19/159;
(Continued)

(56) References Cited

U.S. PATENT DOCUMENTS

2008/0199090 A1* 8/2008 Tasaka .................. H04N 19/80
382/233
2014/0355671 A1* 12/2014 Peng .................... H04N 19/124
375/240.03
(Continued)

FOREIGN PATENT DOCUMENTS

EP    2793467 A1    10/2014
JP    2010-239221    10/2010
(Continued)

OTHER PUBLICATIONS

JVC Kenwood Corporation, JCTVC-H0204, Hiroya Nakamura et al., "Non-CE4: Compatible QP prediction with RC and AQ", Feb. 2012, pp. 1-11.
(Continued)

*Primary Examiner* — Howard D Brown, Jr.
(74) *Attorney, Agent, or Firm* — Greenblum & Bernstein, P.L.C.

(57) ABSTRACT

A moving image encoding device that performs encoding by converting and quantizing a prediction residual difference obtained by applying an interframe prediction or an intraframe prediction to each encoding tree block, which is a divided unit of a frame given by means of equirectangular projection, for each encoding block, includes: a calculation unit that calculates a quantization parameter to be applied to the encoding block on the basis of a pixel value of a pre-coding block and a position in the frame; a prediction unit that obtains a prediction value by predicting the quantization parameter on the basis of a quantization parameter of a left neighboring, and upper neighboring block of the
(Continued)

encoding block, or an already encoded block; and a correction unit that corrects the prediction value and obtains a correction value when a condition is satisfied where the encoding block is positioned at a left end of the frame.

8 Claims, 4 Drawing Sheets

(51) Int. Cl.
    *H04N 19/159*     (2014.01)
    *H04N 19/174*     (2014.01)
    *H04N 19/176*     (2014.01)
    *H04N 19/517*     (2014.01)
    *H04N 19/513*     (2014.01)
    *H04N 19/126*     (2014.01)
    *H04N 19/167*     (2014.01)
    *H04N 19/463*     (2014.01)

(52) U.S. Cl.
    CPC ......... *H04N 19/167* (2014.11); *H04N 19/174* (2014.11); *H04N 19/176* (2014.11); *H04N 19/463* (2014.11); *H04N 19/517* (2014.11); *H04N 19/521* (2014.11)

(58) Field of Classification Search
    CPC .. H04N 19/174; H04N 19/176; H04N 19/517; H04N 19/521; H04N 19/597
    See application file for complete search history.

(56) References Cited

U.S. PATENT DOCUMENTS

| | | | | |
|---|---|---|---|---|
| 2016/0112704 A1* | 4/2016 | Grange | ................. | H04N 19/61 375/240.12 |
| 2016/0142697 A1* | 5/2016 | Budagavi | ............. | H04N 13/156 348/43 |
| 2019/0141318 A1* | 5/2019 | Li | ........................ | H04N 19/159 |

FOREIGN PATENT DOCUMENTS

| JP | 2011-023885 | 2/2011 |
|---|---|---|
| JP | 2015-207909 | 11/2015 |
| WO | 2009/102503 A2 | 8/2009 |
| WO | 2013/088721 A1 | 6/2013 |

OTHER PUBLICATIONS

ITU-T, H.265, "High efficiency video coding", Telecommunication Standardization Sector of ITU, Apr. 2015, pp. 1-634.
International Search Report, dated Dec. 19, 2017, issued in International Application No. PCT/JP2017/033908, dated Dec. 19, 2017.
Yule Sun et al., "AHG8: Stretching ratio based adaptive quantization for 360 video", 6th JVET Meeting: Hobart, AU, Mar. 31, 2017-Apr. 7, 2017; (The Joint Video Exploration Team of ISO/IEC JTC1/SC29/WG11 and ITU-T SG.16); URL: http://phenix.int-evry.fr/jvet, No. JVET-F0072, Mar. 30, 2017 (Mar. 30, 2017), XP030150744.
Fabien Racapé et al., "AHG8: adaptive QP for 360 video coding", 6th JVET Meeting: Hobart, AU, Mar. 31, 2017-Apr. 7, 2017; (The Joint Video Exploration Team of ISO/IEC JTC1/SC29/WG11 and ITU-T SG.16); URL: http://phenix.int-evry.fr/jvet, No. JVET-F0038-v2, Mar. 31, 2017 (Mar. 31, 2017), XP030150692.
Hendry et al., "AHG8: Adaptive QP for 360° video ERP projection", 6th JVET Meeting: Hobart, AU, Mar. 31, 2017-Apr. 7, 2017; (The Joint Video Exploration Team of ISO/IEC JTC1/SC29/WG11 and ITU-T SG.16); URL: http://phenix.int-evry.fr/jvet, No. JVET-F0049-v3, Apr. 4, 2017 (Apr. 4, 2017), XP030150708.
Kei Kawamura et al., "EE3 and 1.1: Cross-check of JVET-G0070", 7th JVET Meeting: Torino, IT, Jul. 13-21, 2017; (The Joint Video Exploration Team of ISO/IEC JTC1/SC29/WG11 and ITU-T SG.16); URL: http://phenix.int-evry.fr/jvet, No. JVET-G0121, Jul. 7, 2017 (Jul. 7, 2017), XP030150925.
Benjamin Bross et al., "High Efficiency Video Coding (HEVC) text specification draft 6", 8th JVET Meeting: San Jose, CA, USA Feb. 1-10, 2012; (Joint Collaborative Team on Video Coding of ISO/IEC JTC1/SC29/WG11 and ITU-T SG.16); URL: http://wftp3.itu.int/av-arch/jctvc-site/, No. JCTVC-H1003, Feb. 10, 2012 (Feb. 10, 2012), XP030111769.
Extended European Search Report, dated Mar. 17, 2020 (Mar. 20, 2017), from the European Patent Office (EPO), in Application No. 17870889.7.
Kei Kawamura et al., "EE3 Test1 and 1.1: Cross-check of JVET-G0070", 7th JVET Meeting: Torino, IT, Jul. 13-21, 2017; (The Joint Video Exploration Team of ISO/IEC JTC1/SC29/WG11 and ITU-T SG.16); URL: http://phenix.int-evry.fr/jvet, No. JVET-G0121, Jul. 7, 2017 (Jul. 7, 2017), XP030150925.

\* cited by examiner

MOVING IMAGE CODING DEVICE, MOVING IMAGE DECODING DEVICE, AND PROGRAM

TECHNICAL FIELD

The present invention relates to a moving image encoding device, a moving image decoding device, and a program capable of performing encoding and decoding while appropriately setting a quantization parameter of a moving image composed of a frame in an equirectangular projection format.

Priority is claimed on Japanese Patent Application No. 2016-222616, filed on Nov. 15, 2016, the contents of which are incorporated herein by reference.

BACKGROUND ART

Non-Patent Document 1 specifies HEVC (H.265) as a standard of a moving image encoding method that uses intra prediction (intraframe prediction) or inter prediction (interframe prediction), residual transformation, and entropy encoding.

An overall schematic operation of a moving image encoding device according to a conventional example that conforms to HEVC is as follows. First, the moving image encoding device divides an input image into a plurality of encoding tree blocks. Next, the moving image encoding device further divides the divided encoding tree blocks into encoding block units, and converts and quantizes an error (residual difference) signal between the input image and an intra prediction image or an inter prediction image to generate a level value. Next, the moving image encoding device performs entropy encoding on the generated level values together with side information (related information required for reconstructing pixel values such as prediction mode and motion vectors) to generate a bit stream.

On the other hand, the moving image decoding device of the conventional example corresponding to the moving image encoding method obtains an output image from the bit stream by performing a reverse procedure to the procedure performed in the moving image encoding device according to the above conventional example. Specifically, the moving image decoding device inverse-quantizes and inverse-converts the level value obtained from the bit stream to generate a residual difference signal, and adds the residual difference signal to the intra prediction image or the inter prediction image. At the same time as using the summed value for the intra prediction, the moving image decoding device applies an in-loop filter (for example, a deblocking filter) to generate a locally decoded image and stores it in a frame buffer. This locally decoded image is used for inter prediction. The process of obtaining the side information and the level value from the bit stream is called a parsing process, and reconstructing the pixel value using the side information and the level value is called a decoding process.

Figure 1:
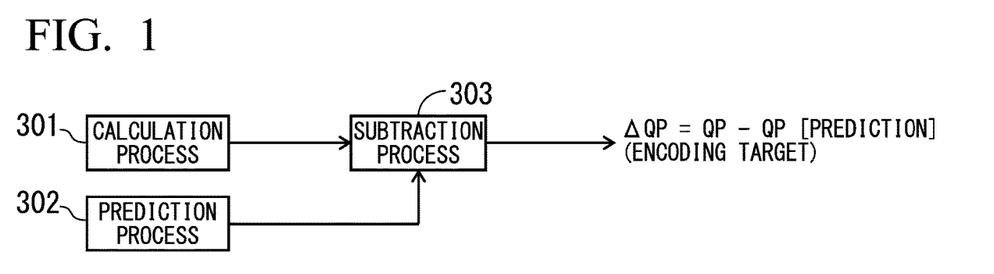
FIG. 1 is a block configuration diagram of a process of deriving a quantization parameter at a time of encoding according to a conventional example.

In the moving image encoding device and the moving image decoding device according to the above conventional example, the quantization parameter in the quantization is derived by adding the predicted quantization parameter and the differential quantization parameter. FIG. 1 shows a block configuration (a configuration at the time of performing encoding) of the derivation processing according to the conventional example. That is to say, at the time of encoding, a quantization parameter QP to be applied to the block is calculated by a calculation process 301, and a prediction process 302 obtains a prediction value QP [prediction] of the quantization parameter QP of the block. Then, the differential quantization parameter ΔQP=QP−QP [prediction] obtained by a subtraction process 303 is encoded. Here, by appropriately performing the prediction process 302, it is possible to suppress the amount of code generated by the differential quantization parameter ΔQP to be encoded and to perform efficient encoding.

Figure 2:
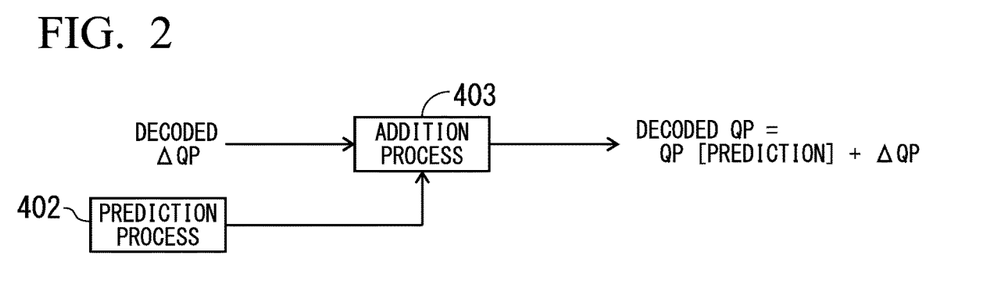
FIG. 2 is a block configuration diagram of a process of deriving a quantization parameter at a time of decoding according to a conventional example.

At the time of decoding (block configuration not shown in the figure), the quantization parameter is derived by decoding the differential quantization parameter by means of the inverse process at the time of the above encoding. FIG. 2 shows a block configuration (a configuration at the time of performing decoding) of the derivation processing according to the conventional example. As shown in the figure, by adding the decoded differential quantization parameter ΔQP and the prediction value QP [prediction] obtained by a prediction process 402 by means of an addition process 403, the quantization parameter QP=QP [prediction]+ΔQP is obtained as decoded.

In the above processing, for quantization parameter prediction (both of the prediction process 302 at the time of encoding in FIG. 1 and the prediction process 402 at the time of decoding in FIG. 2), a quantization parameter set for this frame, a quantization parameter in a quantization block adjacent to this quantization block, or a quantization parameter used one step before in the encoding order (decoding order) is used. The quantization parameter prediction is disclosed in Non-Patent Document 2, Patent Document 1, and the like.

Moreover, there are videos and video experiences called 360-degree video and virtual reality. This is a type of experience of viewing a video in which an image at a time of observing the entire space from a certain point is captured, and at the time of viewing the video, an arbitrary part of the image is projected as though it is captured with a camera of a normal viewing angle. Here, a 360-degree video can be modeled as a state in which pixels are present on the surface of a sphere and viewing is performed from the inside of the sphere. Pixel values can be obtained by evenly sampling the spherical surface, but if this pixel value group is to be directly recorded, position information is required and it is difficult to handle this in an existing image processing.

Figure 3:
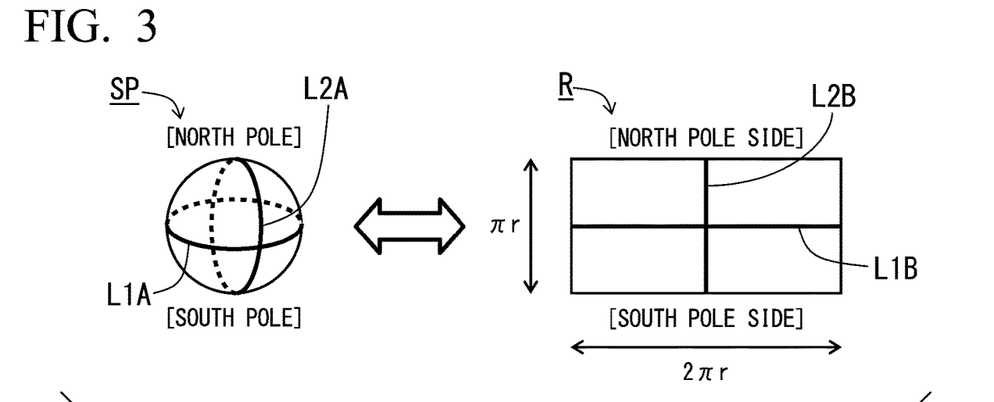
FIG. 3 is a schematic diagram for describing an equirectangular projection.

The equirectangular projection is one of the video formats used in 360-degree video. As schematically shown in FIG. 3, the equirectangular projection is such that the sphere SP is expanded into the rectangular image R where the line L1A corresponding to the equator of the sphere SP is taken as the long side L1B of the rectangular image R, and the line L2A connecting the north pole and the south pole is taken as the short side L2B of the rectangular image R. That is to say, a point specified by a pair (of a longitude value in the east-west direction and a latitude value in the north-south direction) on the spherical surface SP is directly assigned to a point specified by a pair (of an abscissa value and an ordinate value) on the map (rectangular image R). Here, if the radius of the sphere is r, the size of the expanded rectangle (lateral length×longitudinal length) is $(2\pi r) \times (\pi r)$ as shown in FIG. 3, and the aspect ratio is 2:1. Also, the upper and lower sides of the rectangle are stretched near the poles of the sphere. For example, the enlargement ratio in the vicinity of the equator is not more than 1%, but the enlargement ratio increases to approximately 30% at the midpoint between the equator and the pole and the enlargement rate increases ten times or more near the poles.

CITATION LIST

Patent Literature

[Patent Document 1] International Publication No. 2013/088721

Non-Patent Literature

[Non-Patent Document 1] ITU-T H.265 High Efficiency Video Coding.
[Non-Patent Document 2] JCTVC-H 0204 for San Jose meeting (MPEG number m 23078) [online] Internet URL: http://phenix.it-sudparis.eu/jct/doc_end_user/current_document.php?id=4506

SUMMARY OF INVENTION

Problems to be Solved by the Invention

Considering this type of image of equirectangular projection from the viewpoint of encoding, pixels that are sampled at equal intervals from the viewpoint of the latitude value and the longitude value on the spherical surface are over sampled as it gets closer to the upper side/lower side of the expanded rectangular image (the north pole/south pole in the case of the sphere). Therefore, the pixels in the vicinity of the upper side and the lower side in the equirectangular projection do not include high-frequency components and can be easily encoded, or high-frequency components are unnecessary when projected on a spherical surface even if high-frequency components are accurately encoded. Here, in order to efficiently encode redundantly existing pixels, it is necessary to perform quantization in a frame of the equirectangular projection format according to its position so that the result will be the same as that in the case of appropriately performing quantization on the spherical surface.

However, in the prior art, performing quantization in a frame of the equirectangular projection according to its position and performing quantization parameter prediction suitable for quantization according to the position have not been considered.

That is to say, quantization parameter derivation of the HEVC (Non-Patent Document 1) does not take into consideration the intraframe position of quantization blocks. Therefore, there is a problem that the performance of quantization parameter prediction is reduced at a screen edge. Also, if only the number of pixels is focused to determine the quantization parameter in an equirectangular projection format frame, quantization is performed excessively and block noise will be perceived. As a result, there is a problem that the sense of presence is impaired, for example, when experiencing a virtual reality video or the like.

The present invention takes into consideration the problems of the prior arts mentioned above. An object of the present invention is to provide a moving image encoding device, a moving image decoding device, and a program, that are capable of performing encoding and decoding while appropriately setting a quantization parameter of a moving image composed of a frame in the equirectangular projection format, and appropriately predicting the quantization parameter.

Means for Solving the Problem

In order to achieve the above object, an exemplary embodiment of the present invention is a moving image encoding device that performs encoding by converting and quantizing a prediction residual difference obtained by applying an interframe prediction or an intraframe prediction to each encoding tree block, which is a divided unit of a frame given by means of equirectangular projection, for each encoding block constituting the encoding tree block. The moving image encoding device comprises: a calculation unit configured to calculate a quantization parameter (QP) to be applied to the encoding block on the basis of a pixel value of a pre-coding block and a position of the encoding block in the frame; a prediction unit configured to obtain a prediction value (QP [prediction]) by predicting the quantization parameter (QP) to be applied on the basis of a quantization parameter calculated by the calculation unit with respect to a left neighboring block, an upper neighboring block, or an already encoded block of the encoding block; a correction unit configured to correct the prediction value (QP [prediction]) and obtains a correction value (QP) [prediction] [correction]) when a condition is satisfied where the encoding block is positioned at a left end of the frame and the left neighboring block and the upper neighboring block belong to encoding tree blocks that are different from the encoding tree block to which the encoding block belongs, and that obtains the prediction value (QP [prediction]) as a correction value (QP [prediction] [correction]) when the condition is not satisfied; and an encoding unit configured to encode a difference between the correction value (QP [correction] [prediction]) and the quantization parameter (QP) to be applied. Furthermore, an exemplary embodiment of the present invention is a program that causes a computer to function as the moving image encoding device.

Moreover, an exemplary embodiment of the present invention is a moving image decoding device that decodes an encoding stream obtained by converting and quantizing a prediction residual difference obtained by applying an interframe prediction or an intraframe prediction for each encoding tree block, which is a divided unit of a frame given by means of equirectangular projection, and by encoding a differential quantization parameter ($\Delta$QP) between a quantization parameter (QP) to be applied and a prediction value (QP [prediction]) thereof, for each decoding block corresponding to the encoding block. The moving image decoding device comprises: a prediction unit configured to predict a prediction value (QP [prediction]) of a quantization parameter (QP) to be applied to the decoding block, on the basis of the quantization parameter (QP) to be applied that has already been decoded with respect to a left neighboring block, an upper neighboring block, or an already decoded block of the decoding block; a correction unit configured to correct the prediction value (QP [prediction]) and obtains a correction value (QP [prediction] [correction]) when a condition is satisfied where the decoding block is positioned at a left end of the frame, and the left neighboring block and the upper neighboring block belong to encoding tree blocks that are different from the encoding tree block to which the decoding block belongs, and that obtains the prediction value (QP [prediction]) as a correction value (QP [prediction] [correction]) when the condition is not satisfied; and an addition unit configured to add a differential quantization parameter ($\Delta$QP) of the decoding block obtained by decoding the encoding stream, to the correction value (QP [prediction] [correction]), to thereby obtain a quantization parameter (QP) to be applied to the decoding block. Furthermore, an exemplary embodiment of the present invention is a program that causes a computer to function as the moving image decoding device.

Advantageous Effect of the Invention

According to the present invention, it is possible to perform encoding or decoding while appropriately setting a quantization parameter of a moving image composed of a frame in the equirectangular projection format.

DESCRIPTION OF EMBODIMENTS

Figure 4:
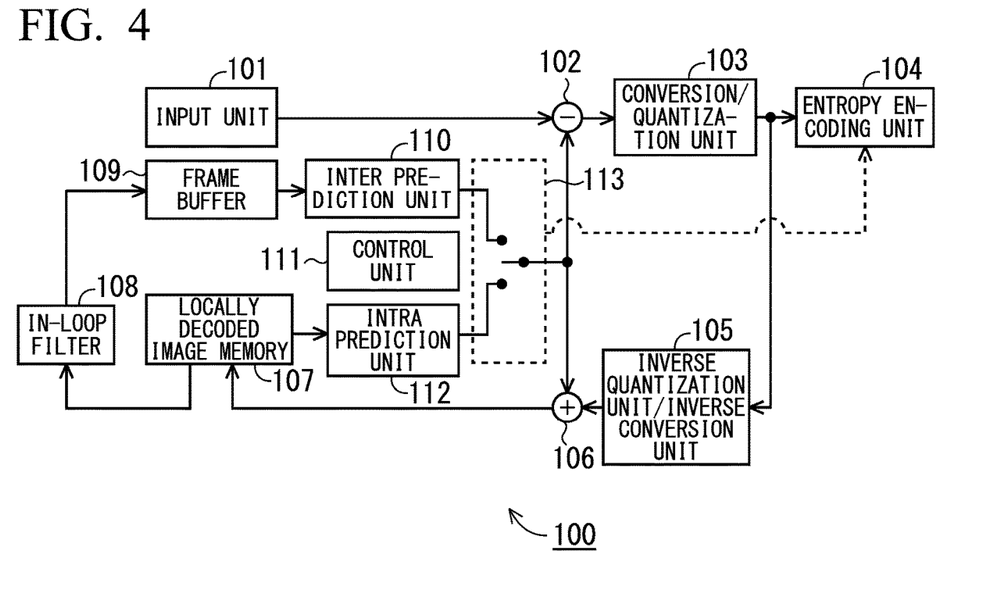
FIG. 4 is a functional block diagram of a moving image encoding device according to an exemplary embodiment.

FIG. 4 is a functional block diagram of a moving image encoding device according to one exemplary embodiment. A moving image encoding device 100 includes; an input unit 101, a differentiator 102, a conversion/quantization unit 103, an entropy encoding unit 104, an inverse quantization/inverse conversion unit 105, an adder 106, a locally decoded image memory 107, an in-loop filter 108, a frame buffer 109, an inter prediction unit 110, a control unit 111, an intra prediction unit 112, and a switch 113.

Figure 5:
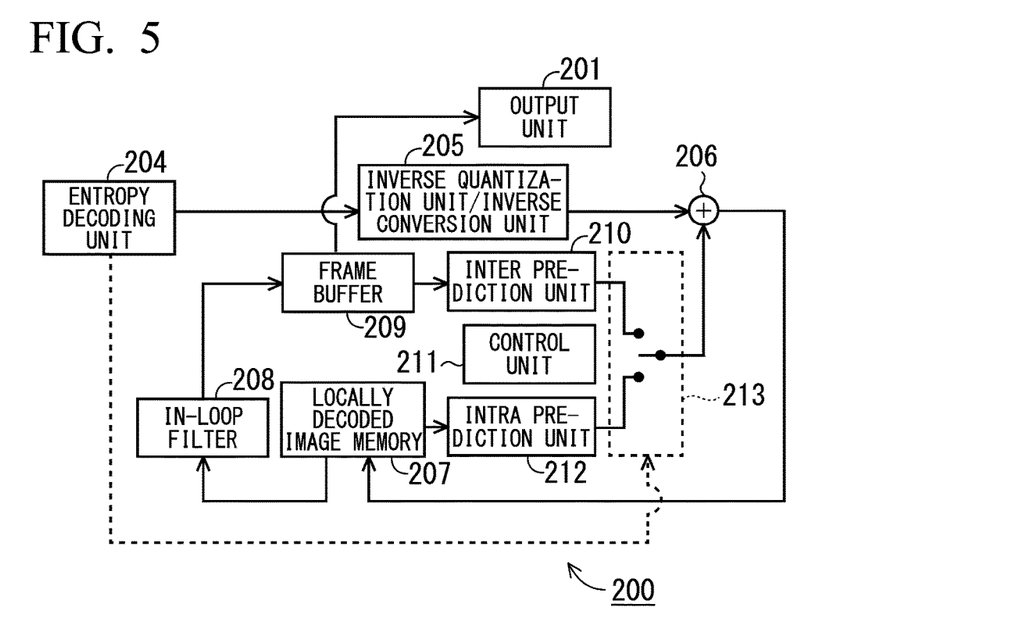
FIG. 5 is a functional block diagram of a moving image decoding device according to the embodiment.

FIG. 5 is a functional block diagram of a moving image decoding device according to one exemplary embodiment. A moving image decoding device 200 includes; an output unit 201, an entropy decoding unit 204, an inverse quantization/inverse conversion unit 205, an adder 206, a locally decoded image memory 207, an in-loop filter 208, a frame buffer 209, an inter prediction unit 210, a control unit 211, an intra prediction unit 212, and a switch 213.

The moving image encoding device 100 shown in FIG. 4 receives an input of a moving image in a normal format in which each frame of a 360-degree video as described with reference to FIG. 3 is converted into a frame of a rectangular image R by means of equirectangular projection. The moving image encoding device 100 applies various predictions and the like to the input moving image and then encodes it. The moving image decoding device 200 shown in FIG. 5 decodes the encoded data, applies corresponding prediction and the like, and then decodes and outputs the original moving image.

The moving image encoding device 100 is abbreviated as an encoder and the moving image decoding device 200 is abbreviated as a decoder. The overall configurations of the encoder and the decoder shown in FIG. 4 and FIG. 5 are in conformity with the HEVC configuration disclosed in Non-Patent Document 1 cited above.

Hereinafter, the outline of each part of the encoder and decoder will be described. As described above, the operation of the overall outline is in conformity with the HEVC. The same or corresponding processes will be described together with the functional parts of the encoder and the decoder.

The input unit 101 receives a moving image to which the equirectangular projection is applied as an encoding target input on the encoder side, and passes this data to the differentiator 102. The output unit 201 outputs, as a decoder-side output, the data accumulated in the frame buffer 209 in which a bit stream obtained by encoding the moving image on the encoder side is decoded on the decoder side. The differentiator 102 obtains a difference between a signal in the moving image data received from the input unit 101 and a signal that is generated as a prediction signal thereof by the inter prediction unit 110 or the intra prediction unit 112 according to the determination of the control unit 111, and passes the difference value to the conversion/quantization unit 103.

The conversion/quantization unit 103 orthogonal-transforms the difference obtained from the differentiator 102 for each block and takes it as a conversion coefficient. Furthermore the conversion/quantization unit 103 quantizes the conversion coefficient and passes the quantization value to the entropy encoding unit 104 and the inverse quantization/inverse conversion unit 105. The entropy encoding unit 104 performs entropy encoding on the quantization value obtained from the conversion/quantization unit 103 and on prediction parameters output from the control unit 111 as necessary (prediction parameters and the like in the inter prediction unit 110 or the intra prediction unit 112 that have been applied by switching of the switch 113) to output them as encoder side outputs.

In particular, in the present exemplary embodiment, in the conversion/quantization unit 103 there is performed quantization with a quantization parameter suitable for the characteristics of the moving image of the equirectangular projection. The entropy encoding unit 104 also encodes the difference value of the quantization parameter (hereinafter, referred to as the quantization value parameter difference value) in addition to the above quantization value. Details of these will be described later with reference to FIG. 6.

The entropy decoding unit 204 receives the bit stream output from the encoding side by the entropy encoding unit 104 as a decoder side input, and performs entropy decoding thereon, and obtains a quantization value, a prediction parameter and the like, and a quantization value parameter difference value. The quantization value and the quantization value parameter difference value are passed to the inverse quantization/inverse conversion unit 205, and the prediction parameter and the like are passed to the control unit 211.

The inverse quantization/inverse conversion unit 105 (the inverse quantization/inverse conversion unit 205) inverse-quantizes and inverse-converts the quantization value received from the conversion/quantization unit 103 (the entropy decoding unit 204) into a difference value (a pixel difference value, that is, a difference value as a prediction residual difference) by means of the inverse process of the conversion/quantization unit 103, and passes it to the adders 106, 206. The inverse quantization/inverse conversion unit 205 uses the quantization value parameter difference value received from the entropy decoding unit 204 when obtaining the difference value of the pixel, and details of this will be described later with reference to FIG. 7.

According to the determination of the control units 111, 211, the adders 106, 206 add the prediction signal generated by any of the inter prediction units 110, 210 and the intra prediction units 112, 212 to the difference values (prediction residual differences) output from the inverse quantization/inverse conversion units 105, 205, to generate decoded signals. Then, the adders 106, 206 pass the decoded signals to the locally decoded image memories 107, 207.

The locally decoded image memories 107, 207 hold the decoded signals and provide them as references when the intra prediction units 112, 212 perform prediction, and output the decoded signals to the in-loop filters 108, 208. The in-loop filters 108, 208 apply an in-loop filtering processing to the decoded signal and output the result to the frame buffers 109, 209.

The frame buffers 109, 209 hold the signals that have undergone the filtering processing and provide them as references when the inter prediction units 110, 210 perform prediction. On the decoder side, as described above, the frame buffer 209 passes the signal that has undergone the filtering processing, to the output unit 201 as a decoder output.

The inter prediction units 110, 210 perform inter prediction using the reference signals of the frame buffers 109, 209 (motion prediction, inter-screen prediction) to generate a prediction signal, and pass the prediction signal through the switches 113, 213 to the differentiator 102 and the adder 106 (only to the adder 206 on the decoder side). On the encoder side, prediction parameters such as motion vectors are generated and encoded at the time of generation of the prediction signal, whereas on the decoder side, the prediction parameters are used for generating the prediction signal.

The intra prediction units 112, 212 perform intra prediction using the reference signals of the locally decoded image memories 107, 207 (intra-screen prediction) to generate a prediction signal, and pass the prediction signal through the switches 113, 213 to the differentiator 102 and the adder 106 (only to the adder 206 on the decoder side). On the encoder side, prediction parameters such as prediction mode in the intra prediction are generated and encoded at the time of generation of the prediction signal, whereas on the decoder side, the prediction parameters are used for generating the prediction signal.

Under the control of the control units 111, 211, in the case where the inter prediction units 110, 210 are applied to this block, the switches 113, 213 output the prediction signals output by the inter prediction units 110, 210, to the differentiator 102 and the adder 106 (the adder 206 only on the decoder side). Moreover, in the case where the intra prediction units 112, 212 are applied to this block, the switches 113, 213 output the prediction signals output by the intra prediction units 112, 212, to the differentiator 102 and the adder 106 (the adder 206 only on the decoder side).

The control units 111, 211 perform overall control in encoding performed by the moving image encoding device 100 and decoding performed by the moving image decoding device 200. This control includes distinguishing application of inter prediction and intra prediction in each frame of a moving image, setting block sizes, and setting specific quadtree segmentation structure in the encoding tree unit obtained by dividing each frame described in FIG. 8. On the encoder side, parameters and the like necessary for this control are encoded, and on the decoder side, they are decoded and passed to the functional units required by the parameters.

On the encoder side, when a prediction parameter is generated in either the inter prediction unit 110 or the intra prediction unit 112, the control unit 111 performs control so that the prediction parameter is passed to the entropy encoding unit 104 as indicated by the dotted line in FIG. 4. Then, the control unit 111 causes the entropy encoding unit 104 to encode the prediction parameter. On the decoder side, when the prediction parameter is decoded, it is passed to the corresponding prediction unit (inter prediction unit 210 or intra prediction unit 212).

In FIG. 4 and FIG. 5, the flow of prediction parameter transfer between the control unit 111 or 211 and the prediction units 110, 112 or 210, 212, and the flow of data transfer between the control unit 111 or 211 and the function unit of the control target at the time of performing other control processing of the control units 111, 211, are omitted in the figure as the figure becomes complicated. That is to say, FIG. 4 and FIG. 5 focus on the flow of the pixel-related processing at the time of encoding and decoding (excluding the flow of processing related to the quantization parameter described later with reference to FIG. 6 and FIG. 7), and the flow of transfer of other control signals is omitted.

Figure 6:
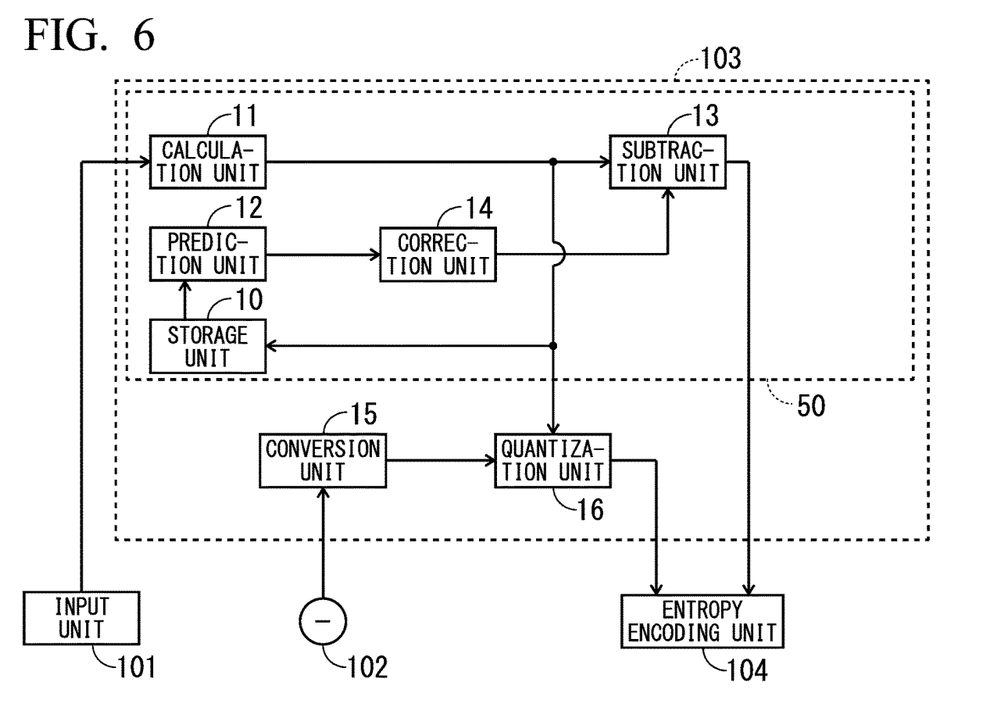
FIG. 6 is a functional block diagram showing in detail a conversion/quantization unit in FIG. 4 according to the embodiment.

FIG. 6 is a functional block diagram showing in further detail one exemplary embodiment of the quantization parameter-related processing in the conversion/quantization unit 103 in FIG. 4. The conversion/quantization unit 103 includes a conversion unit 15, a quantization unit 16, and a derivation unit 50. The derivation unit 50 further includes a storage unit 10, a calculation unit 11, a prediction unit 12, a subtraction unit 13, and a correction unit 14.

As a whole, the derivation unit 50 performs a process corresponding to the derivation process in the conventional example described with reference to FIG. 1, that is to say, a process for deriving a quantization parameter for the block used in the quantization unit 16. Here, the calculation unit 11 performs processing corresponding to the calculation process 301 of FIG. 1, the storage unit 10 and the prediction unit 12 perform processing corresponding to the prediction process 302 of FIG. 1, and the subtraction unit 13 performs processing corresponding to the subtraction process 303 of FIG. 1. The derivation unit 50 of the present exemplary embodiment is particularly of a configuration in which a correction process is added to the prediction process 302 of FIG. 1 as a result of the correction unit 14 being added to the corresponding configuration of FIG. 1.

The conversion unit 15 and the quantization unit 16 perform a conversion process and a quantization process conforming to the HEVC defined in Non-Patent Document 1 cited above. Specifically, these processes are performed as described below.

The conversion unit 15 applies orthogonal transformation such as discrete cosine transformation or approximate transformation thereof on the prediction residual output from the differentiator 102 to obtain a conversion coefficient, and outputs the conversion coefficient to the quantization unit 16. The quantization unit 16 quantizes the conversion coefficient output from the conversion unit 15 using a quantization matrix corresponding to the quantization parameter for the block output from the derivation unit 50 to obtain a quantization value, and outputs it to the entropy encoding unit 104. As the quantization matrix used in the quantization unit 16, there can be used a predetermined matrix that corresponds to the prediction (inter prediction or intra prediction) applied to the block, or the size of the block, in addition to the quantization parameter output from the derivation unit 50.

As described above, the derivation unit 50 executes the processing corresponding to the derivation processing of FIG. 1 after adding the correction processing performed by the correction unit 14 of the present exemplary embodiment. Specifically, this processing is performed as described below.

The calculation unit 11 calculates a quantization parameter QP to be applied to the conversion coefficient of the encoding target block, and outputs the quantization parameter QP to the subtraction unit 13 and the quantization unit 16. Here, for the process of calculating the quantization parameter QP, calculation processing conforming to the HEVC described in Non-Patent Document 1 cited above can be used. That is to say, an appropriate quantization parameter QP can be calculated on the basis of the activity of the pixel in the state before encoding the encoding target block, obtained by making reference to the input unit 101, and/or a difference value between the transition of the data amount result value of the encoded bit stream continuously output by the entropy encoding unit 104 and the target encoding amount at the current point in time determined from the preliminarily set target bit rate (that is to say, a rough indication of the encoding amount that can be assigned to the block).

Here, the activity of the block can be calculated by variance of the pixel value of the block in the state before encoding. The calculation unit 11 monitors the data amount of the encoded bit stream output from the entropy encoding unit 104 as described above. However the arrow and the like of the flow of monitoring are omitted in FIG. 6.

Furthermore, here, in the calculation unit 11 of the present exemplary embodiment, when calculating the quantization parameter according to the conventional method described above, an appropriate quantization parameter calculation is performed in consideration of the encoding target moving image frame being configured as one used in the equirectangular projection method as described in FIG. 3. Specifically, this processing is performed as described below.

That is to say, as shown in the following (Equation 1), the calculation unit 11 adds the function value COR (D) that becomes greater as the block position gets away from the equator to the north pole or the south pole described in FIG. 3 (D is a distance on the rectangular image R in FIG. 3 between the equator line L1B and the block position (center of gravity and the like), that is, a deviation distance of the block from the equator). As a result, the calculation unit 11 can obtain the quantization parameter QP (D) suitable for the image of the equirectangular projection.

$$QP(D)=QP(0)+COR(D) \quad \text{(Equation 1)}$$

In (Equation 1) above, QP (0) is a predetermined quantization parameter when the block corresponds to an equatorial position (a position of D=0) as a reference position, and it can be calculated by the above-described conventional method. Here, the function COR (D) that defines the addition amount in the above (Equation 1) may be set on the basis of the following consideration.

A ratio of the number of pixels between the spherical surface and the equirectangular projection according to the location (a magnification ratio, that is, an area ratio when projecting the rectangle within the frame onto the spherical surface by means of equirectangular projection at the position D of the frame given by the equirectangular projection) is enlarged at approximately the degree 6 or more of a polynomial, although it is not as high as an exponential function. Also, as the quantization parameter increases by 6, the quantization step doubles. For example, the ratio of the number of pixels located at latitude 75 degrees to 90 degrees is approximately 7.7 times. When the addition amount COR (position of latitude 75 degrees to 90 degrees) for correction is determined in consideration of this relationship, the correction value of the quantization parameter is 23. Since block noise occurs in this case, it is necessary to suppress the correction value of the quantization parameter to approximately 6. Accordingly, by setting the addition value COR (D) proportional to the logarithm of the area ratio at the position D of the block, it is possible to reduce the encoding amount and suppress block noise.

As another example of the COR (D) above, COR 2 ($y$) given by the following mathematical expression (Equation 1A) may be used.

$$COR2(y)=\text{floor}(\text{clip}(-a\ \log(\sin\ y\pi)),b)) \quad \text{(Equation 1A)}$$

Here, y represents the distance (0 to 1.0 as a value) from the upper part of the image (or the lower part of the image) normalized by the height of the image in the equirectangular projection. That is to say, y corresponds to a value obtained by normalizing the distance D and changing the definition of the orientation (D is a deviation from the equatorial center, whereas y is a deviation from the polar side), and corresponds to a value expressed as COR (D)=COR2 (y). Here clip (v, V) is a clip function that makes the value v 0 or more and V or less. Moreover floor (v) is a truncation function that truncates the value v to an integer. A coefficient a and a coefficient b are correction values. For example, the coefficient a and the coefficient b are 9.0 and 10.0 respectively.

As described above, the calculation unit 11 obtains, in each block, a quantization parameter that is calculated using the activity of the pixel and/or the difference value between the target encoding amount as described above by means of the conventional calculation process conforming to the HEVC, as a value in the case where the equatorial position is assumed as the value of QP (0) in (Equation 1), that is, a reference value (a reference value based on assumption that the block is supposedly at an equatorial position). Then, by adding the addition amount COR (D) in (Equation 1) or COR 2 ($y$) in (Equation 1A) as another example thereof, an appropriate quantization parameter QP (D) that takes the position D into consideration can be obtained.

Moreover, in the above description, the value of the quantization parameter is obtained by the calculation process conforming to the conventional HEVC for the case of the block being at the equatorial position as the reference value, but the position that serves as a reference value may be set at a position away from the equatorial position.

In the storage unit 10, by storing the quantization parameter QP (=QP (D)) calculated by the calculation unit 11 as described above, the stored quantization parameter is provided as a reference for the prediction process of the prediction unit 12 described next.

The prediction unit 12 makes reference to the quantization parameter QP that has already been encoded in the past before the current quantization block and is stored in the storage unit 10. As a result, the prediction unit 12 obtains the prediction value QP [prediction] of the quantization parameter to be applied to the current quantization block, and outputs it to the correction unit 14.

The correction unit 14, in the case where the current quantization block meets a certain condition, corrects the prediction value QP [prediction] output from the prediction unit 12 to give a corrected quantization parameter prediction value QP [prediction] [correction] and outputs it to the subtraction unit 13. The correction unit 14, in the case where the certain condition is not met, outputs the prediction value QP [prediction] output from the prediction unit 12 to the subtraction unit 13 without correcting or changing the value. Details of the certain condition and the correction will be described later.

The subtracting unit 13 subtracts, from the quantization parameter QP (=QP (D)) calculated by the calculation unit 11 for the quantization block, the prediction quantization parameter QP [prediction] [correction] that has been predicted in the prediction unit 12 and that has been corrected when the certain condition is met (this representation shows the value in both cases where correction is made and where correction is not made. The same applies hereafter) to obtain a differential quantization parameter ΔQP. Then, the subtraction unit 13 outputs the differential quantization parameter ΔQP as an encoding target to the entropy encoding unit 104.

As the prediction processing performed by the prediction unit 12, one conforming to Non-Patent Document 2 or Patent Document 1 cited above can be used. That is to say, as described above, the prediction unit 12 performs prediction, using: (1) a quantization parameter set for the frame, (2) a quantization parameter in a quantization block adjacent to this quantization block, or (3) a quantization parameter used one step before in the encoding order (decoding order). Here, (2) and (3) are stored in the storage unit 10, and (1) can also be stored in the storage unit 10 as a setting value.

Specifically, as shown in (Equation 2) below, as a general rule, the prediction unit 12 calculates an average value of the quantization parameter QP [LEFT] of the left-adjacent quantization block of the quantization block and the quantization parameter QP [ABOVE] of the upper-adjacent quantization block of the quantization block and gives it as the prediction value QP [prediction].

$$QP[Prediction]=(QP[LEFT]+QP[ABOVE])/2 \quad \text{(Equation 2)}$$

However, as an exception, when predicting as an average value in the above (Equation 2), the prediction unit 12 replaces the value of the QP [LEFT] with the value of the quantization parameter QP [PREV] that has been used one step before in the encoding order (decoding order) in the case where the left-adjacent quantization block of the quantization block belongs to an encoding tree block that is different from an encoding tree block to which the quantization block belongs. Similarly, the prediction unit 12 replaces the value of the QP [ABOVE] with the value of the quantization parameter QP [PREV] that has been used one step before in the encoding order (decoding order) in the case where the upper-adjacent quantization block of the quantization block belongs to an encoding tree block that is different from an encoding tree block to which the quantization block belongs. Therefore, when both the left and upper adjacent blocks of the quantization block belong to encoding tree blocks that are different from an encoding tree block to which the quantization block belongs, QP [prediction]=QP [PREY]. Further, when prediction cannot be used or is specified, as described above, the prediction unit 12 can use (1) the quantization parameter set for the frame, as a prediction value.

Here is shown a case where the prediction performed by the prediction unit 12 (prediction of the conventional method of Non-Patent Document 2) is directly applied. In this case, when a certain condition is satisfied, it may become inappropriate as a prediction value of the quantization parameter QP (D) that is calculated assuming the frame of the equirectangular projection in the calculation unit 11 (that is to say, the difference amount ΔQP obtained in the subtraction unit 13 becomes large). Specifically, the case where the certain condition is satisfied is as follows (Condition A).

(Condition A): A case where the quantization block is located at the left end of the frame and both the upper adjacent quantization block and the left adjacent quantization block of the quantization block belong to encoding tree blocks (CTUs) that are different from the encoding tree block to which the quantization block belongs.

Figure 8:
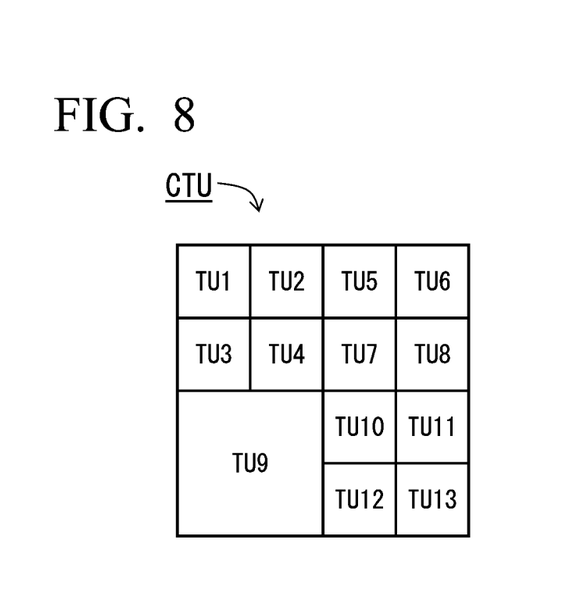
FIG. 8 is a diagram showing an example of an encoding tree unit of a quadtree structure.

FIG. 8 is a diagram showing an example of an encoding tree block (CTU) in the HEVC, and quantization blocks constituting the CTU. In FIG. 8, as an example of the encoding tree block CTU, there is shown a case where the block CTU has a size of 64×64 and includes 13 individual quantization blocks (that is, conversion blocks that are also encoding blocks) TU1 to TU13 as shown in the figure. A predetermined order of quantization (and encoding that accompanies it) is determined in the encoding tree block CTU, and the blocks TU1 to TU13 are quantized in the order of the assigned reference symbols (in the order of TU1→TU2→TU3→ . . . →TU12→TU13). As shown in the figure, only the block TU9 is twice the size of the other blocks (32×32), and the other blocks are configured with the size of (16×16).

For example, since the block TU8 and the block TU9 are spatially distanced from each other, inconvenience arises when the quantization parameter of the block TU8 is used as the quantization parameter of the block TU9. Furthermore, the left adjacent of the block TU9 is another encoding tree block, which is inappropriate as a reference region for prediction. Therefore, in order to predict the quantization parameter of the block TU9, it is possible to use and make reference to the block TU3 by the prediction unit 12 (the prediction method of Non-Patent Document 2 mentioned above).

Figure 9:
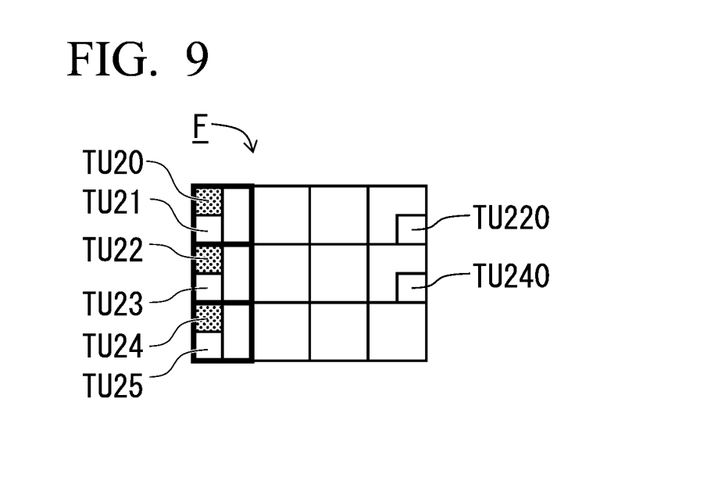
FIG. 9 is a diagram showing a schematic example of a quantization block satisfying a (condition A).

On the other hand, FIG. 9 is a diagram showing a schematic example of a quantization block satisfying the (Condition A). In FIG. 9, as a schematic example of a frame F, an example is shown that includes a total of 12 CTUs, that is, 4 horizontal×3 vertical. Among the set of CTUs in FIG. 9, the "quantization blocks located at the left end of the frame" represents six TUs 20 to 25 on the leftmost side among TUs in the three CTUs at the left end of the frames (the earlier side in the raster scan order) indicated by the thick-line frames. Among these six TUs 20 to 25, the ones where the left adjacent quantization block and the upper adjacent quantization block (both) belong to CTUs that differ from the CTU to which it belongs, are TU20, TU22, and TU24 shown in gray, and these three are the example that satisfies the (Condition A). In the example of FIG. 9, it is assumed that the scanning order in the encoding tree block is approximately the same as that illustrated in FIG. 8. In FIG. 9, portions other than the illustrated TUs are assumed to be divided into arbitrary TUs, and the details of the division of these TUs are not particularly illustrated in the figure.

Considering that prediction performed by the prediction unit 12 is applied to TU20, TU22, and TU24 satisfying the (Condition A), the following inconvenience occurs. That is to say, since TU20 is the first quantized block of the first CTU of the frame F, there is no quantization block suitable for reference as prediction (intra prediction) in the first place. Moreover, with respect to TU22, TU220 that is located at one step higher and present in the CTU at the right end of the frame becomes the prediction reference block. However, since TU220 and TU22 differ from each other in the position D in the vertical direction, the appropriate quantization parameter value defined by (Equation 1) has a difference generated as a result of the difference in the value D of the term COR (D). Therefore, if the prediction of the prediction unit 12 is simply applied, the difference caused by the difference in the position D will not be zero and will remain as an encoding target in the subtraction unit 13, and an extra encoding amount will be generated as a result. Similarly, with respect also to TU24, TU240 is referred to in the prediction of the prediction unit 12, but the difference resulting from the difference in the value of D of COR (D) causes an extra encoding amount to be generated.

Therefore, as a first exemplary embodiment, in the case where the quantization block satisfies the (Condition A) as described above, the correction unit 14 of the present exemplary embodiment performs the correction process so that the difference with respect to the appropriate prediction value that occurs as a result of the difference in the vertical direction position of the quantization block to be referenced for prediction, becomes zero. Specifically, here is shown an example in which the vertical position of the quantization block is D [current] and the vertical position of the quantization block to be referenced for calculating a prediction value by the prediction unit 12 according to the above (Equation 2) (the value of the prediction value QP [prediction] by the quantization block is QP [PREY] because the (Condition A) is satisfied) is D [reference]. In this case, the correction unit 14 corrects the prediction value QP [prediction] of the prediction unit 12 as shown in the following (Equation 3) to obtain a correction value QP [prediction] [correction]. COR (D) in (Equation 3) is as described in (Equation 1). As described above, COR 2 (y) given by (Equation 1A) may be used in place of COR (D) in (Equation 3).

$$\text{QP[prediction][correction]}=\text{QP[prediction]}+\text{COR}(D\text{[current]})-\text{COR}(D\text{[reference]}) \quad \text{(Equation 3)}$$

In the correction unit 14, as a second exemplary embodiment, a correction value QP [prediction] [correction] may be obtained as in the following (Equation 4).

$$\text{QP[prediction][correction]}=\text{QP[given]} \quad \text{(Equation 4)}$$

In (Equation 4), QP (given) is a quantization parameter given to the slice to which the quantization block belongs. The specific value of QP [given] may be set to a value calculated by the above (Equation 1), that is, the calculation unit 11, as an appropriate quantization parameter in the quantization block at the position D.

In the first exemplary embodiment according to (Equation 3), the prediction value of the prediction unit 12 is corrected as a difference (that is, a relative value) according to the term "COR (D [present])–COR (D [reference])". On the other hand, in the second exemplary embodiment according to (Equation 4), the prediction value of the prediction unit 12 is corrected (as it were, by completely overwriting and replacing it) with the absolute value QP [given] dependent on the position D. In the above description, the correction unit 14 responsible for the correction process on the encoder side has been described with reference to FIG. 6. However the correction unit 24 performs exactly the same correction processing on the decoder side, as will be described below. The correction unit 24 also performs the correction process according to the first exemplary embodiment or the second exemplary embodiment. In order to enable the correction process, it is assumed that (Equation 1) is common to the encoder side and the decoder side. By making reference to the information of the function COR (D) in the information of (Equation 1), the first exemplary embodiment becomes possible in the correction unit 24 on the decoder side. Moreover, by making reference to the entire information of (Equation 1), the second exemplary embodiment becomes possible in the correction unit 24 on the decoder side. To indicate whether or not (Equation 1) is used, a flag on a picture unit basis is sent as side information.

As a third exemplary embodiment that is substantially the same approach as that of the method for correcting the prediction value of the prediction unit 12 as a difference according to the term "COR (D [present]-COR (D [reference])" given by (Equation 3) by means of the correction unit 14 of the first exemplary embodiment described above, the following process may be performed. That is to say, regarding the quantization block that satisfies (Condition A), it is sufficient that the difference according to the term "COR (D [present])–COR (D [reference])" given by (Equation 3) is encoded as a value of the differential quantization parameter ($\Delta$QP) corresponding to the quantization block. Furthermore, regarding the quantization block that satisfies (Condition A), a quantization parameter that is obtained by adding the prediction value QP [prediction] obtained by the prediction unit 12 for the quantization block to the differential quantization parameter $\Delta$QP, is encoded. As a result, it becomes possible for the decoder side to make reference to the quantization parameter as the reference value in the case where it satisfies the position D of the quantization block (that is, the vertical direction position D in the frame). In FIG. 6 (FIG. 6 with the configuration in which the correction unit 14 is omitted), illustration of the flows of the addition process and the encoding process for making this reference possible are omitted.

In the third exemplary embodiment, an appropriate differential quantization parameter ($\Delta$QP) is directly associated with a quantization block that satisfies (Condition A), and is encoded, and the prediction unit 12 that conforms to the method of Non-Patent Document 2 performs prediction by one of the three methods (1) to (3) as described above. Accordingly, in the third exemplary embodiment, the correction unit 14 is omitted as a result.

Figure 7:
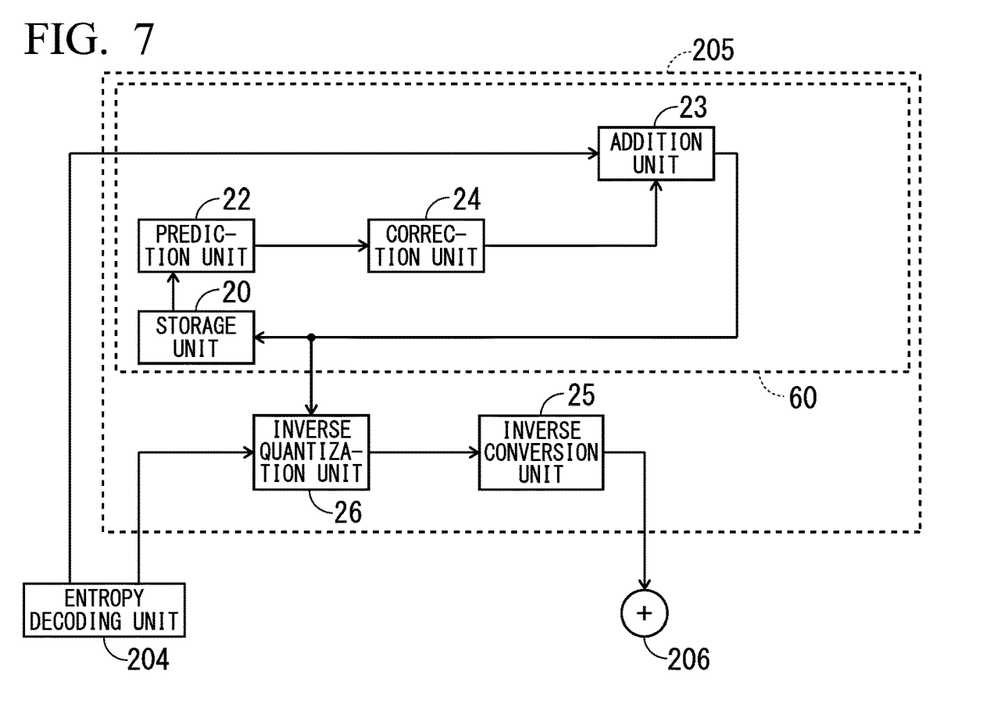
FIG. 7 is a functional block diagram showing in detail an inverse quantization/inverse conversion unit in FIG. 5 according to the embodiment.

FIG. 7 is a functional block diagram showing in further detail one exemplary embodiment of the quantization parameter-related processing in the inverse quantization/inverse conversion unit 205 in FIG. 5. The inverse quantization/inverse conversion unit 205 includes an inverse quantization unit 26, an inverse conversion unit 25, and a derivation unit 60. The derivation unit 60 further includes a storage unit 20, a prediction unit 22, an addition unit 23, and a correction unit 24.

As a whole, the derivation unit 60 performs a process corresponding to the derivation process described with reference to FIG. 2, that is to say, a process for deriving a quantization parameter for the block used in the inverse quantization unit 26. Here, the storage unit 20 and the prediction unit 22 perform processing corresponding to the prediction process 402 of FIG. 2, and the addition unit 23 performs processing corresponding to the addition processing 403 of FIG. 2. The derivation unit 60 of the present exemplary embodiment is particularly of a configuration in which a correction unit 24 is further added to the corresponding configuration of FIG. 2.

The inverse quantization unit 26 and the inverse conversion unit 25 perform an inverse conversion process and an inverse quantization process conforming to the HEVC defined in Non-Patent Document 1 cited above. Specifically, this processing is performed as described below.

The inverse quantization unit 26 inversely applies a quantization matrix corresponding to the quantization parameter of the block obtained by the derivation unit 60 to the quantization value output from the entropy decoding unit 204 to obtain a conversion coefficient, and outputs this conversion coefficient to the inverse conversion unit 25. The inverse conversion unit 25 inversely converts the conversion coefficient to obtain a prediction residual difference, and outputs it to the adder 206. That is to say, the inverse quantization unit 26 and the inverse conversion unit 25 respectively perform the inverse processing of the quantization unit 16 and the conversion unit 15 in FIG. 6.

As described above, the derivation unit 60 executes the processing corresponding to the derivation processing of FIG. 2 after adding the correction processing performed by the correction unit 24 of the present exemplary embodiment. Specifically, this processing is performed as described below.

The addition unit 23 adds the differential quantization parameter ΔQP obtained by being decoded in the entropy decoding unit 204, to the correction value QP [prediction] [correction] of the quantization parameter prediction value obtained from the correction unit 24. As a result, the addition unit 23 obtains the decoded quantization parameter QP=QP [prediction] [correction]+ΔQP for the block, and outputs it to the inverse quantization unit 26 and the storage unit 20.

In the storage unit 20, by storing the quantization parameter QP serving as a correction value output from the addition unit 23, the stored quantization parameter QP is provided as a reference for the prediction process of the prediction unit 22 described next. That is to say, the role of the storage unit 20 with respect to the prediction unit 22 on the decoder side is similar to the role of the storage unit 10 with respect to the prediction unit 12 on the encoder side.

The prediction unit 22 make reference to the storage unit 20 to obtain a quantization parameter QP [prediction] for the target quantization block and outputs it to the correction unit 24. The prediction processing of the prediction unit 22 on the decoder side is similar to the prediction processing of the prediction unit 12 on the encoder side described in FIG. 6, and therefore, a detailed description thereof will be omitted.

The correction unit 24 obtains a correction value QP [prediction] [correction] of the prediction value by correcting the prediction value QP [prediction] obtained from the prediction unit 22, and outputs it to the addition unit 23. The correction processing performed by the correction unit 24 on the decoder side is similar to the correction processing of the correction unit 14 on the encoder side described in FIG. 6. Therefore, a detailed description thereof will be omitted. As described with the correction unit 14 on the encoder side, the correction unit 24 on the decoder side also corrects the prediction value QP [prediction] by means of the first exemplary embodiment or the second exemplary embodiment and outputs it to the addition unit 23 in the case where the decoding target quantization block satisfies (Condition A). In the case where (Condition A) is not satisfied, the correction unit 24 outputs the value of the prediction value QP [prediction] obtained by the prediction unit 22 directly to the addition unit 23 without correction.

Furthermore, as described with the correction unit 14 on the encoder side, in the case where the encoder side employs the third exemplary embodiment described above and encodes directly the differential quantization parameter for the quantization block satisfying (Condition A), the correction unit 24 on the decoder side can also be omitted.

That is to say, in the third exemplary embodiment as a whole on the encoder side and the decoder side, the following effect can be achieved. On the encoder side, as described above, for the quantization block satisfying (Condition A), an appropriate quantization parameter considering the equirectangular projection according to the in-frame vertical direction position D is obtained by causing the prediction unit 22 to perform the prediction process and the addition unit 23 to perform the process of adding the differential quantization parameter. On the other hand, on the encoder side, the quantization parameter is encoded and the differential quantization parameter is encoded and transmitted also to the decoder side.

On the decoder side, likewise, for the quantization block satisfying (Condition A), the prediction unit 22 outputs a prediction value corresponding to the quantization block, and the transmitted differential quantization parameter ΔQP is added. Therefore, the correction unit 24 is skipped, and the quantization parameter output from the addition unit 23 is directly used in the inverse quantization unit 26. Also, it becomes possible for the decoder side to decode and make reference to the quantization parameter as the reference value in the case where it corresponds to the position D of the quantization block (that is, the vertical direction position D in the frame) encoded on the encoder side described above, according to the framework of an existing decoding device conforming to HEVC. In FIG. 7 (with the configuration in which the correction unit 24 is omitted), illustration of the flow of enabling the referencing process is omitted.

As described above, it is possible to control the operation within the framework of the prediction of Non-Patent Documents 2 cited above, so that when (Condition A) is satisfied on both the encoder side and the decoder side, an appropriate differential quantization parameter (an appropriate differential quantization parameter considering the equirectangular projection peculiar to the present exemplary embodiment) is used. Furthermore, for the quantization blocks that do not satisfy (Condition A), on the encoder side and the decoder side, the prediction units 12, 22 can obtain an appropriate prediction quantization parameter by means of the method of Non-Patent Document 2 cited above, on the basis of the appropriate quantization parameter given in the quantization block of (Condition A).

That is to say, in the third exemplary embodiment, the following effect is achieved by performing the operation as described above. That is to say, with the configuration in which the correction unit 14 in FIG. 6 is omitted and the correction unit 24 in FIG. 7 is omitted, on both the encoder side and the decoder side, appropriate encoding and decoding in consideration of the equirectangular projection are possible with the operation of the prediction units 12, 22 conforming to the method of Non-Patent Document 2 cited above.

As described above, according to the present exemplary embodiment, it is possible to perform encoding or decoding while appropriately setting a quantization parameter of a moving image composed of a frame in the equirectangular projection format, and appropriately predicting the quantization parameter. The moving image encoding device 100 (FIG. 4) and the moving image decoding device 200 (FIG. 5) of the present exemplary embodiment can be realized on a computer of a general configuration with a CPU that reads and executes a predetermined program for realizing the function of each part of FIG. 4 and FIG. 5 (as well as FIG. 6 and FIG. 7). For example, the computer of a general configuration includes a CPU, a primary memory that provides a work area to the CPU, and a secondary storage device that stores predetermined data, programs, and the like. Moreover, instead of realizing an arbitrary part or all parts of FIG. 4 and FIG. 5 (as well as FIG. 6 and FIG. 7) by executing a program on a general-purpose CPU, a dedicated hardware (such as a dedicated LSI) may be employed to realize these parts.

INDUSTRIAL APPLICABILITY

According to the present invention, it is possible to perform encoding or decoding while appropriately setting a quantization parameter of a moving image composed of a frame in the equirectangular projection format.

REFERENCE SYMBOLS

100 Moving image encoding device
50 Derivation unit
10 Storage unit
11 Calculation unit
12 Prediction unit
13 Subtraction unit
14 Correction unit
200 Moving image decoding device
60 Derivation unit
20 Storage unit
22 Prediction unit
23 Addition unit
24 Correction unit

The invention claimed is:

1. A moving image encoding device that performs encoding by converting and quantizing a prediction residual difference obtained by applying an interframe prediction or an intraframe prediction to each encoding tree block, which is a divided unit of a frame given by means of equirectangular projection, for each encoding block constituting the encoding tree block, the moving image encoding device comprising:
a calculation unit configured to calculate a quantization parameter (QP) to be applied to the encoding block on the basis of a pixel value of a pre-coding block and a position of the encoding block in the frame;
a prediction unit configured to obtain a prediction value (QP [prediction]) by predicting the quantization parameter (QP) to be applied on the basis of a quantization parameter calculated by the calculation unit with respect to a left neighboring block, an upper neighboring block, or an already encoded block of the encoding block;
a correction unit configured to correct the prediction value (QP [prediction]) and obtains a correction value (QP) [prediction] [correction]) when a condition is satisfied where the encoding block is positioned at a left end of the frame and the left neighboring block and the upper neighboring block belong to encoding tree blocks that are different from the encoding tree block to which the encoding block belongs, and that obtains the prediction value (QP [prediction]) as a correction value (QP [prediction] [correction]) when the condition is not satisfied; and
an encoding unit configured to encode a difference between the correction value (QP [correction] [prediction]) and the quantization parameter (QP) to be applied.

2. A moving image encoding device that performs encoding by converting and quantizing a prediction residual difference obtained by applying an interframe prediction or an intraframe prediction to each encoding tree block, which is a divided unit of a frame given by means of equirectangular projection, for each encoding block constituting the encoding tree block, the moving image encoding device comprising:
a prediction unit configured to obtain a prediction value (QP [prediction]) by predicting the quantization parameter (QP) to be applied to the encoding block on the basis of a quantization parameter calculated with respect to a left neighboring block, an upper neighboring block, or an already encoded block of the encoding block; and
an encoding unit configured to, when a condition is satisfied where the encoding block is positioned at a left end of the frame and the left neighboring block and the upper neighboring block belong to encoding tree blocks that are different from the encoding tree block to which the encoding block belongs, encodes a differential quantization parameter ($\Delta$QP) using a predetermined function set on the basis of an area ratio at a time of projecting on a spherical surface from a rectangle in the frame by means of the equirectangular projection, and that encodes it as a quantization parameter at a vertical position in the frame of the quantization block by adding the differential quantization parameter ($\Delta$QP) to a prediction value (QP [prediction]) obtained by the prediction unit.

3. A moving image decoding device that decodes an encoding stream obtained by converting and quantizing a prediction residual difference obtained by applying an interframe prediction or an intraframe prediction for each encoding tree block, which is a divided unit of a frame given by means of equirectangular projection, and by encoding a differential quantization parameter ($\Delta$QP) between a quantization parameter (QP) to be applied and a prediction value (QP [prediction]) thereof, for each decoding block corresponding to the encoding block, the moving image decoding device comprising:
a prediction unit configured to predict a prediction value (QP [prediction]) of a quantization parameter (QP) to be applied to the decoding block, on the basis of the quantization parameter (QP) to be applied that has already been decoded with respect to a left neighboring block, an upper neighboring block, or an already decoded block of the decoding block;
a correction unit configured to correct the prediction value (QP [prediction]) and obtains a correction value (QP [prediction] [correction]) when a condition is satisfied where the decoding block is positioned at a left end of the frame, and the left neighboring block and the upper neighboring block belong to encoding tree blocks that are different from the encoding tree block to which the decoding block belongs, and that obtains the prediction value (QP [prediction]) as a correction value (QP [prediction] [correction]) when the condition is not satisfied; and
an addition unit configured to add a differential quantization parameter ($\Delta$QP) of the decoding block obtained by decoding the encoding stream, to the correction value (QP [prediction] [correction]), to thereby obtain a quantization parameter (QP) to be applied to the decoding block.

4. The moving image decoding device according to claim 3, wherein
when the decoding block satisfies the condition, the correction unit performs the correction by means of an equation QP[prediction][correction]=QP[prediction]+COR($D$[current])−COR($D$[reference])
where:

the prediction value (QP [prediction]) is taken as a QP [prediction]; the correction value (QP [prediction] [correction]) is taken as a QP [prediction] [correction]; a function COR (D) is an increasing function of a distance D in a vertical direction from a center position in the vertical direction in the frame at a decoding block position; the decoding block position is taken as a distance D [current]; and the position of the already decoded block that has been referenced by the prediction unit to predict the prediction value (QP [prediction]) for the decoding block is taken as a distance D [reference].

5. The moving image decoding device according to claim 3, wherein
when the condition is satisfied, the correction unit obtains a quantization parameter given to a slice to which the decoding block belongs, as the correction value (QP [prediction] [correction]).

6. The moving image decoding device according to claim 5, wherein
a quantization parameter QP (D) given to the slice to which the decoding block belongs is given by means of an equation $QP(D)=QP(0)+COR(D)$ where:

a function COR (D) is an increasing function of a distance D in a vertical direction from a center position in the vertical direction in the frame at a decoding block position; and a predetermined value of a quantization parameter to be applied to a center position in the vertical direction is QP (0).

7. The moving image decoding device according to claim 4, wherein
the function COR (D) is a predetermined function that is set on the basis of an area ratio at a time of projecting on a spherical surface from a rectangle in the frame by means of the equirectangular projection, in a distance D at the position of the frame given by means of the equirectangular projection.

8. The moving image decoding device according to claim 6, wherein
the function COR (D) is a predetermined function that is set on the basis of an area ratio at a time of projecting on a spherical surface from a rectangle in the frame by means of the equirectangular projection, in a distance D at the position of the frame given by means of the equirectangular projection.

* * * * *